(12) United States Patent
Stratmann et al.

(10) Patent No.: US 11,192,417 B2
(45) Date of Patent: Dec. 7, 2021

(54) ARRANGEMENT FOR CONNECTING A CHASSIS LINK TO A WHEEL CARRIER

(71) Applicant: ZF Friedrichshafen AG, Friedrichshafen (DE)

(72) Inventors: Julian Stratmann, Melle (DE); Florian Bäumer, Westerkappeln (DE); Josef Holtheide, Neuenkirchen (DE); Felix Kallass, Osnabrück (DE); Thorsten Sander, Rahden (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 42 days.

(21) Appl. No.: 16/626,368

(22) PCT Filed: Jun. 6, 2018

(86) PCT No.: PCT/EP2018/064825
§ 371 (c)(1),
(2) Date: Dec. 24, 2019

(87) PCT Pub. No.: WO2019/007616
PCT Pub. Date: Jan. 10, 2019

(65) Prior Publication Data
US 2020/0114718 A1     Apr. 16, 2020

(30) Foreign Application Priority Data
Jul. 4, 2017  (DE) .................. 10 2017 211 393.6

(51) Int. Cl.
*B60G 7/00* (2006.01)
*F16C 11/06* (2006.01)
*B60G 7/02* (2006.01)

(52) U.S. Cl.
CPC ............... *B60G 7/02* (2013.01); *B60G 7/005* (2013.01); *F16C 11/0628* (2013.01);
(Continued)

(58) Field of Classification Search
CPC .......... B60G 2204/41; B60G 2204/416; B60G 2204/143; B60G 2204/116; B60G 7/005; B60G 7/02; F16C 11/0614; F16C 11/0628
See application file for complete search history.

(56) References Cited

U.S. PATENT DOCUMENTS 6,550,795 B1  4/2003  Schlosser et al.
7,652,470 B2  1/2010  Spratte
(Continued)

FOREIGN PATENT DOCUMENTS

DE    101 10 738 C1   11/2002
DE    103 58 763 A1   7/2005
(Continued)

OTHER PUBLICATIONS

German Office Action Corresponding to 10 2017 211 393.6 dated Apr. 1, 2019.
(Continued)

*Primary Examiner* — Paul N Dickson
*Assistant Examiner* — Maxwell L Meshaka
(74) *Attorney, Agent, or Firm* — Finch & Maloney, PLLC; Michael J. Bujold; Jay S. Franklin

(57) ABSTRACT

An arrangement for connecting a link (1) of a chassis to a wheel carrier (2) by way of a ball sleeve joint (3). The link (1) has an link eye (1a), the ball sleeve joint (3) has a ball sleeve (7), and the wheel carrier (2) has two bearing eyes (4, 5). A sensor is located on the link eye (1a) and a signal generator is located on the ball sleeve (7). The sensor and signal generator form an angle measuring device. The ball sleeve (7) is connected to the bearing eyes (4, 5) via a threaded pin (6). An anti-rotation unit (9, 10) is provided between the ball sleeve (7) and the wheel carrier (2) in order to fix a defined angular position of the ball sleeve (7) with respect to the wheel carrier (2).

9 Claims, 4 Drawing Sheets

(52) U.S. Cl.
CPC .. *B60G 2204/116* (2013.01); *B60G 2204/143* (2013.01); *B60G 2204/416* (2013.01)

(56) References Cited

U.S. PATENT DOCUMENTS

| | | | |
|---|---|---|---|
| 8,179,128 B2 | 5/2012 | Klank et al. | |
| 2002/0063005 A1* | 5/2002 | Klais | B60G 7/02 180/167 |
| 2003/0201589 A1* | 10/2003 | Adema | F16F 1/3842 267/36.1 |
| 2004/0190805 A1* | 9/2004 | Ersoy | B60Q 1/115 384/448 |
| 2006/0220285 A1* | 10/2006 | Urquidi | B60G 17/019 267/140.12 |
| 2006/0220330 A1* | 10/2006 | Urquidi | F16F 1/38 280/5.516 |
| 2006/0220638 A1* | 10/2006 | Urquidi | B60G 17/01933 324/207.25 |
| 2007/0122232 A1* | 5/2007 | Buchner | F16C 11/0614 403/122 |
| 2015/0352919 A1* | 12/2015 | Kraschienski | B60G 7/02 280/86.751 |
| 2017/0058945 A1* | 3/2017 | James | F16C 11/069 |
| 2017/0146126 A1 | 5/2017 | Hudson et al. | |
| 2020/0216116 A1* | 7/2020 | Backulja | F16B 19/02 |

FOREIGN PATENT DOCUMENTS

| | | |
|---|---|---|
| DE | 10 2006 061 976 A1 | 7/2008 |
| DE | 10 2017 208 410 A1 | 8/2018 |
| EP | 1 977 955 A1 | 10/2008 |
| JP | H07-17229 A | 1/1995 |

OTHER PUBLICATIONS

International Search Report Corresponding to PCT/EP2018/064825 dated Sep. 3, 2018.
Written Opinion Corresponding to PCT/EP2018/064825 dated Sep. 3, 2018.

* cited by examiner

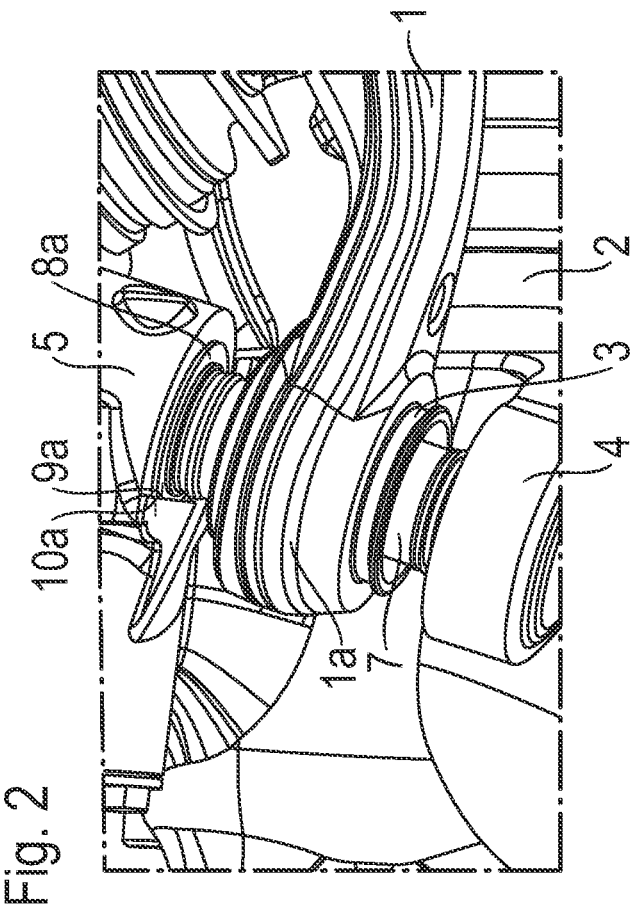
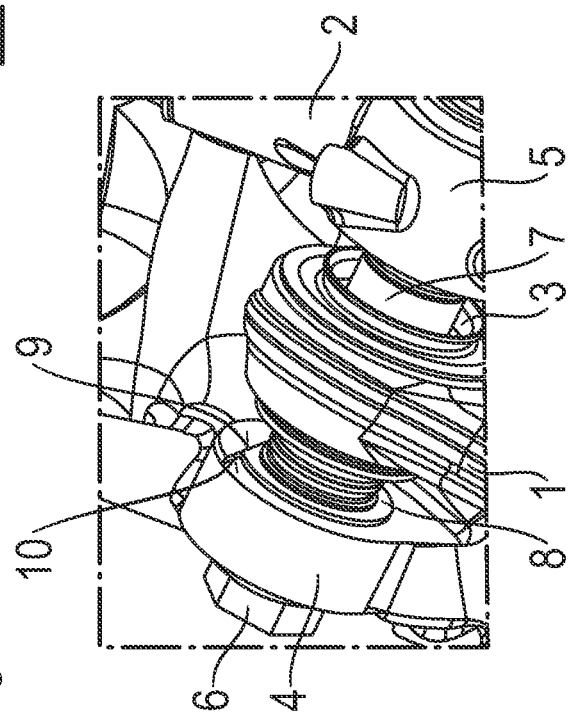

ARRANGEMENT FOR CONNECTING A CHASSIS LINK TO A WHEEL CARRIER

This application is a National Stage completion of PCT/EP2018/064825 filed Jun. 6, 2018, which claims priority from German patent application serial no. 10 2017 211 393.6 filed Jul. 4, 2017.

FIELD OF THE INVENTION

The invention relates to an arrangement for connecting a chassis control arm to a wheel carrier on a motor vehicle by means of a ball sleeve joint, wherein the control arm comprises a control arm eye, the ball sleeve joint a ball sleeve and the wheel carrier two bearing eyes, wherein a sensor is arranged on the control arm eye and a signal emitter in the ball sleeve, which sensor and emitter form an angle measuring device, and wherein the ball sleeve is secured to the bearing eyes by a threaded bolt.

BACKGROUND OF THE INVENTION

In the older German application by the same applicant with file number 10 2017 208 410 a ball sleeve joint is disclosed, which connects a control arm of a chassis to a wheel carrier. The ball sleeve, which is arranged between two bearing eyes of the wheel carrier, is secured by means of a threaded bolt between the bearing eyes. The ball sleeve joint comprises a joint housing which is directly connected to the control arm, preferably a transverse control arm. The ball sleeve joint is fitted with a sensor arrangement for detecting the position of the control arm relative to the wheel carrier. In this case a first sensor, preferably a magnetic field sensor, is arranged on the joint housing, while a second sensor element, preferably a permanent magnet, is arranged as the signal emitter on the ball sleeve. When a change of position takes place, in particular the angular position relative to the longitudinal axis of the ball sleeve, between the ball sleeve and the joint housing or the control arm, the magnetic field changes whereby a signal is produced in the magnetic field sensor which is representative of the angular position. During the fitting of such a ball sleeve joint, which has only one signal emitter or magnet at its circumference, the problem can arise that the signal emitter—viewed in the circumferential direction—adopts a position which lies outside the magnetically sensitive range of the magnetic field sensor.

SUMMARY OF THE INVENTION

An aim of the present invention is to improve further the object of the older application, particularly in relation to the functionally appropriate structure of the ball sleeve joint with its integrated position sensor.

The invention embodies the characteristics specified in the independent claim(s). Advantageous design features emerge from the subordinate claims.

According to the invention, between the ball sleeve and the wheel carrier rotation-preventing means are provided in order to fix a defined angular position between the ball sleeve and the wheel carrier. The rotation-preventing means are designed such that at least a first interlocking element is arranged on the ball sleeve and at least a second interlocking element is arranged on the wheel carrier or the bearing eyes, which are brought into engagement during the fitting of the ball sleeve. This ensures that the ball sleeve, which can rotate arbitrarily during the fitting of the ball sleeve joint, is brought to a defined angular position in which it is fixed.

In a preferred embodiment at least one end side of the ball sleeve has a flattened area on its circumference and at least one end side of the bearing eyes has a corresponding edge, such that the flattened area and the edge engage with one another, i.e. rotation of the ball sleeve relative to the bearing eyes or wheel carrier is not possible—in this angularly correct position the threaded bolt can be inserted into the through-holes of the bearing eyes and the ball sleeve, and tightened. Thus, the ball sleeve secured against rotating relative to the wheel carrier is held in the defined angular position. This ensures that the sensor on the bearing eye "sees" the signal emitter or single magnet and can accordingly produce a signal whenever relative movement between the control arm and the ball sleeve takes place as a result of a change of the magnetic field.

According to a further preferred embodiment, the flattened area and the corresponding edge extend rectilinearly in the tangential direction relative to the longitudinal axis of the ball sleeve. This gives the advantage that the ball sleeve with its rotation-preventing means according to the invention can be fitted without problems, i.e. it can be inserted between the bearing eyes transversely to the longitudinal axis in such manner that the flattened area slides along the edge of the wheel carrier. As soon as the through-hole of the bearing eyes is aligned with the through-hole in the ball sleeve, the threaded bolt can be inserted through them and tightened. If the assembly is carried out erroneously, the threaded bolt cannot be inserted through the through-holes since they are not aligned. Accordingly, by virtue of the rotation-preventing means according to the invention erroneous assembly is also avoided.

In a further preferred embodiment, on at least one end side of the ball sleeve a disk is arranged and fixed, and the flattened area is formed on the circumference of the disk. The disk is preferably pressed on a collar on the end side, so that the length of the ball sleeve is not changed. Preferably two disks are provided, one on each end side. Thus, the rotation-preventing means according to the invention can be retrofitted to a mass-produced ball sleeve joint without much effort.

According to a further preferred embodiment the signal emitter is in the form of a cylindrical magnet, whole poles are orientated in the radial direction relative to the pivot axis and/or the longitudinal axis of the ball sleeve joint. As mentioned above, preferably only a single magnet is arranged at the circumference, and this has cost advantages.

In a further preferred embodiment the signal emitter or magnet is arranged on the ball sleeve in the longitudinal direction of the control arm, which generally corresponds to the direction of the force in the control arm, or transversely to the longitudinal direction. Depending on the loading of the control arm these two angular positions are preferred.

BRIEF DESCRIPTION OF THE DRAWINGS

An example embodiment of the invention is illustrated in the drawings and is described in greater detail in what follows, so that from the description and/or the drawings further features and/or advantages can emerge. The drawings show:

FIG. 1: A first 3D representation of a connection of a control arm to a wheel carrier of a motor vehicle, FIG. 2: A second 3D representation of the connection of the control arm according to FIG. 1, viewed from another perspective.

DETAILED DESCRIPTION OF THE PREFERRED EMBODIMENTS

Figure 6:
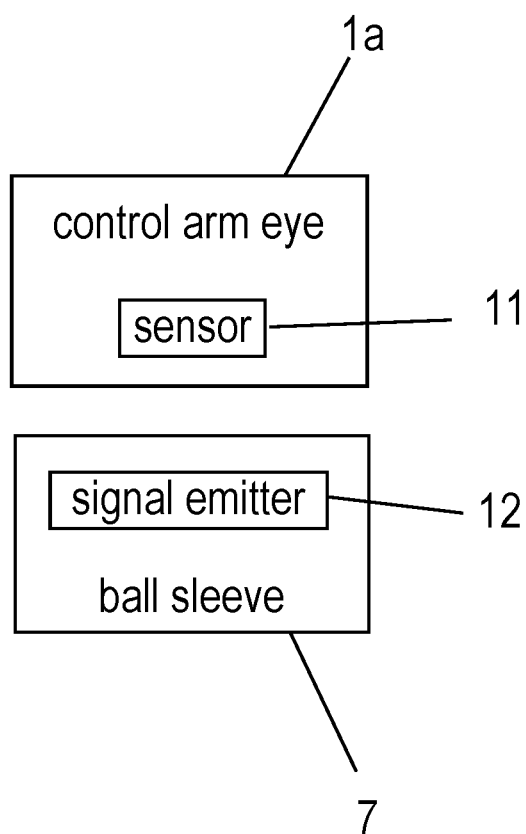
FIG. 6: A diagrammatic view of a sensor arrangement including a sensor and a signal emitter.

FIGS. 1 and 2 show first and second 3D representations of the connection of a control arm 1 to a wheel carrier 2, as part of a chassis for a motor vehicle, viewed from different perspectives. The control arm 1, which has an annular control arm eye 1a, is connected by a ball sleeve joint 3 which is held in the control arm eye 1a and is therefore only partly visible, by means of two bearing eyes 4, 5 and a threaded bolt 6 to the wheel carrier 2. So far as concerns the structure of the ball sleeve joint 3, reference should be made to the older application by the present applicant mentioned earlier, with file number 10 2017 208 410, whose disclosure content is fully subsumed in the present application. FIG. 1 shows the cylindrical part of a ball sleeve 7, which extends on both sides of the control arm 1 and is held fast between the bearing eyes 4, 5 by the threaded bolt 6. The articulated joint between the control arm 1 and the ball sleeve 7 features a sensor arrangement which comprises a sensor 11 arranged on the control arm eye 1a and a signal emitter 12, preferably in the form of a permanent magnet, arranged on the ball sleeve 7. The sensor arrangement is diagrammatically shown in FIG. 6 and reference should be made as well to the older application, in particular FIG. 1 thereof and the associated description.

According to the invention, the ball sleeve 7 is fitted and fixed in a defined angular position which depends on the position of the signal emitter relative to the wheel carrier 2 or the two bearing eyes 4, 5. For this, the ball sleeve 7 has at its ends two disks 8, 8a, of which in FIG. 1 the first disk 8 can be seen, which has at its circumference a flattened area 9. On the end surface of the bearing eye there is a tangentially extending edge 10, which is in contact with the flattened area 9. The first disk 8, which is connected to the ball sleeve 7 with interlock or by frictional force, is therefore prevented from rotating. In FIG. 2, which shows the ball sleeve 7 from another perspective, the second disk 8a with a flattened area 9a can be seen, this being in contact with an edge 10a of the second bearing eye 5. Thus, when the ball sleeve joint 3 is assembled a defined angular position of the signal emitter on the ball sleeve 7 is established.

Figure 3:
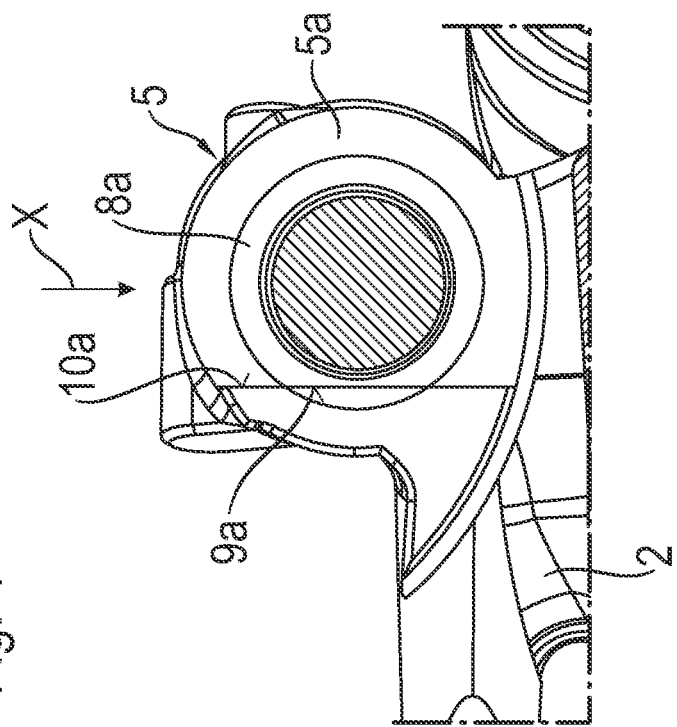
FIG. 3: A view in the axial direction, of the end side of a first bearing eye with a tangentially extending edge.

FIG. 3 shows a view in the axial direction, i.e. in the direction of the longitudinal axis of the ball sleeve (not shown here), of an end side 4a of the first bearing eye 4, in which the edge 10 extending in the drawing perpendicularly and tangentially relative to the longitudinal axis of the ball sleeve can be seen. In addition the first disk 8, which is connected to the ball sleeve 7 (FIGS. 1 and 2), is shown with the tangentially extending flattened area 9, which is engaged with the edge 10, i.e. is in contact therewith. Accordingly the first disk 8 and hence the ball sleeve are fixed in a defined angular position.

Figure 4:
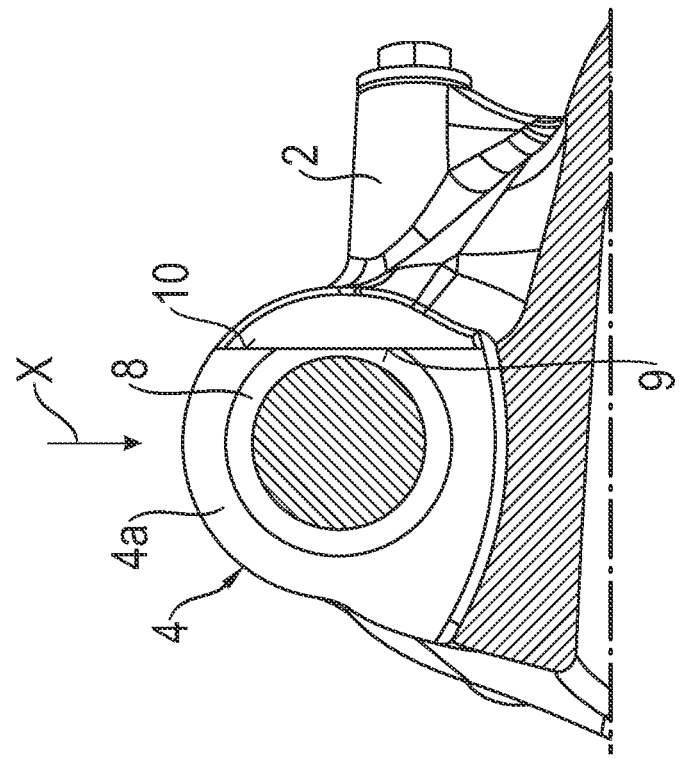
FIG. 4: A view in the axial direction, of the end side of a second bearing eye with a tangentially extending edge.

FIG. 4 shows a view in the axial direction, of an end surface 5a of the second bearing eye 5, with an edge 10a that stands out relative to the end surface 5a, which corresponds to the edge 10 in FIG. 3 and is directly opposite this in the wheel carrier 2 in the axial direction. Also shown is the second disk 8a, which is also connected to the ball sleeve and has a flattened area 9a that is engaged with the edge 10a. During the assembly of the ball sleeve 7 or ball sleeve joint 3 with the control arm 1 (FIGS. 1 and 2), the ball sleeve 7 with its two disks 8, 8a is inserted from the top downward, as indicated by the arrow X, between the two bearing eyes 4, 5, so that the flattened areas 9, 9a slide on the edges 10, 10a, i.e. the ball sleeve 7 maintains its angular position predetermined by the flattened areas 9, 9a relative to the wheel carrier. As soon as the longitudinal axis of the ball sleeve is aligned with the longitudinal axis of the through-holes, the threaded bolt (not shown here) can be inserted through the bearing eyes 4, 5 and the ball sleeve 7 (FIG. 1), and tightened. Thus, the ball sleeve is fixed in relation to its angular position. In the event of erroneous assembly the threaded bolt 6 cannot be inserted.

In the example embodiment shown two disks, a first disk 8 and a second disk 8a, are attached to the ball sleeve 7. Basically however, it is enough for one disk, the first disk 8 or the second disk 8a, to establish the desired angular position.

Figure 5:
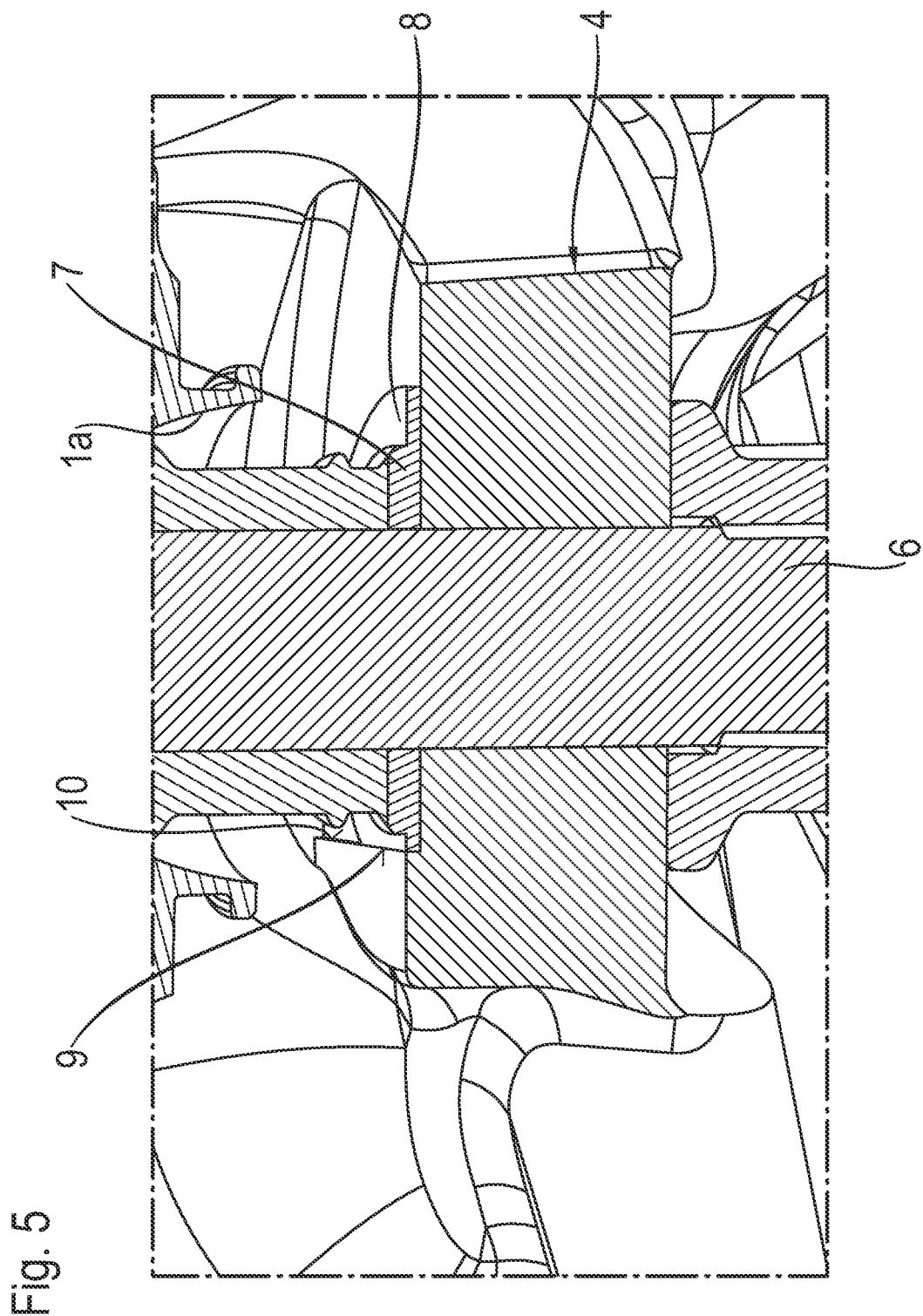
FIG. 5: An axial section in the area of a disk pressed onto a ball sleeve, with rotation-preventing means.

FIG. 5 shows a sectioned representation, i.e. an axial section in the area of the rotation-preventing means between the ball sleeve 7 and the first bearing eye 4. The first disk 8 has the flattened area 9—on the left in the drawing, which is engaged with the edge 10 and thereby fixes the angular position of the ball sleeve 7. The threaded bolt extends through the through-holes of the bearing eye 4 and the ball sleeve 7. The control arm eye 1a is partially visible.

Indexes

1 Control arm
1a Control arm eye
2 Wheel carrier
3 Ball sleeve joint
4 First bearing eye
4a End side
5 Second bearing eye
5a End side
6 Threaded bolt
7 Ball sleeve
8 First disk
8a Second disk
9 Flattened area
9a Flattened area
10 Edge
10a Edge
X Assembly direction

The invention claimed is:

1. An arrangement for connecting a control arm of a chassis to a wheel carrier by a ball sleeve joint,
   the control arm having a control arm eye,
   the ball sleeve joint having a ball sleeve which defines a longitudinal axis and extends from opposite axial sides of the control arm eye, and the control arm eye being rotatable about the longitudinal axis relative to the ball sleeve,
   the wheel carrier having first and second bearing eyes,
   a sensor being arranged on the control arm eye,
   a signal emitter being arranged on the ball sleeve,
   the sensor and the signal emitter forming an angle measuring device,
   the ball sleeve being connected to the first and the second bearing eyes by a threaded bolt, and
   rotation preventing means being provided, between the ball sleeve and the wheel carrier, at least one disk is fixed to at least one axial end of the ball sleeve, the rotation preventing means comprising a radially outer facing surface of the at least one disk and a radially inner facing surface of the first bearing eye, and the radially outer facing surface mates with the radially inner facing surface to fix a defined angular position of the ball sleeve relative to the wheel carrier.

2. The arrangement according to claim 1, wherein the radially outer facing surface has a flattened area at its circumference and the radially inner facing surface of the first bearing eye has a corresponding flattened edge, and the flattened area and the flattened edge engage with one another to fix the defined angular position of the ball sleeve relative to the wheel carrier.

3. The arrangement according to claim 2, wherein the flattened area and the corresponding flattened edge extend rectilinearly in a tangential direction relative to the longitudinal axis of the ball sleeve.

4. The arrangement according to claim 2, wherein the at least one disk is arranged and fixed, on the at least one axial end of the ball sleeve, and the flattened area is arranged on a circumference of the at least one disk.

5. The arrangement according to claim 1, wherein the signal emitter is in a form of a cylindrical magnet.

6. The arrangement according to claim 5, wherein the cylindrical magnet is arranged in the ball sleeve either in a longitudinal direction of the control arm or displaced therefrom by 90°.

7. The arrangement according to claim 1, wherein the first bearing eye of the wheel carrier has an end surface that axial faces the control arm eye and the radially inner facing surface of the first bearing eye extends from the end surface of the first bearing eye toward the control arm eye.

8. The arrangement according to claim 1, wherein the radially outer facing surface of the at least one disk being slidable along the radially inner facing surface of the first bearing eye to align the ball sleeve with the first bearing eye.

9. The arrangement according to claim 1, wherein rotation preventing means being provided axially between the ball sleeve and the first bearing eye and axially between the ball sleeve and the second bearing eye.

* * * * *